2 Sheets—Sheet 1.

C. F. TUTTLE.

Hot Air Register.

No. 1,346.

Reissued Oct. 14, 1862.

Inventor
Charles F. Tuttle

Inventor
Charles F. Tuttle

N. PETERS. Photo-Lithographer. Washington, D. C.

2 Sheets—Sheet 2.

C. F. TUTTLE.

Hot Air Register.

No. 1,346. Reissued Oct. 14, 1862.

N. PETERS, Photo-Lithographer, Washington, D. C.

UNITED STATES PATENT OFFICE.

EDWARD A. TUTTLE, WILLIAM TUTTLE, AND JAMES S. BAILEY, OF NEW YORK, N. Y., ASSIGNEES OF THE ADMINISTRATORS OF CHARLES F. TUTTLE, DECEASED.

IMPROVEMENT IN HOT-AIR REGISTERS.

Specification forming part of Letters Patent No. 6,060, dated January 23, 1849; Reissue No. 136, dated May 1, 1849; Reissue No. 1,346, dated October 14, 1862.

*To all whom it may concern:*

Be it known that we, EDWARD A. TUTTLE, WILLIAM TUTTLE, and JAMES S. BAILEY, composing the firm of TUTTLE & BAILEY, assignees of the administrators of the estate of CHARLES F. TUTTLE, deceased, all of the city, county, and State of New York, do hereby declare that CHARLES F. TUTTLE aforesaid did invent a new and useful Improvement in Hot-Air Registers, used for the purpose of regulating the admission of heated air into rooms or dwellings from hot-air furnaces or other warming apparatus, or for ventilating rooms and dwellings, for which Letters Patent were granted to him, bearing date January 23, 1849, and afterward surrendered and canceled and new Letters Patent issued to him, and a certain portion thereof assigned to JAMES S. BAILEY aforesaid; and we, for the purpose of obtaining a reissue, do hereby declare that the following is a full, clear, and exact description of the same.

The nature of the invention consists in the new and improved method adopted in opening and closing the register or ventilator by means of an upright or vertical wheel, or a segment of a wheel, which is connected with and gives motion to the valves, as hereinafter shown and described.

To enable those skilled in the art to fully understand and construct the invention, we will proceed to describe it.

The register is constructed of metals as others usually are, and in the usual form. The top or surface is made open by scroll or fret work, so as to admit the passage of warm air freely, and at the same time to protect the valves, as in the case of a person walking over the register, if placed in the floor.

The drawings and description describe the register when constructed in a square form.

Figure 1:
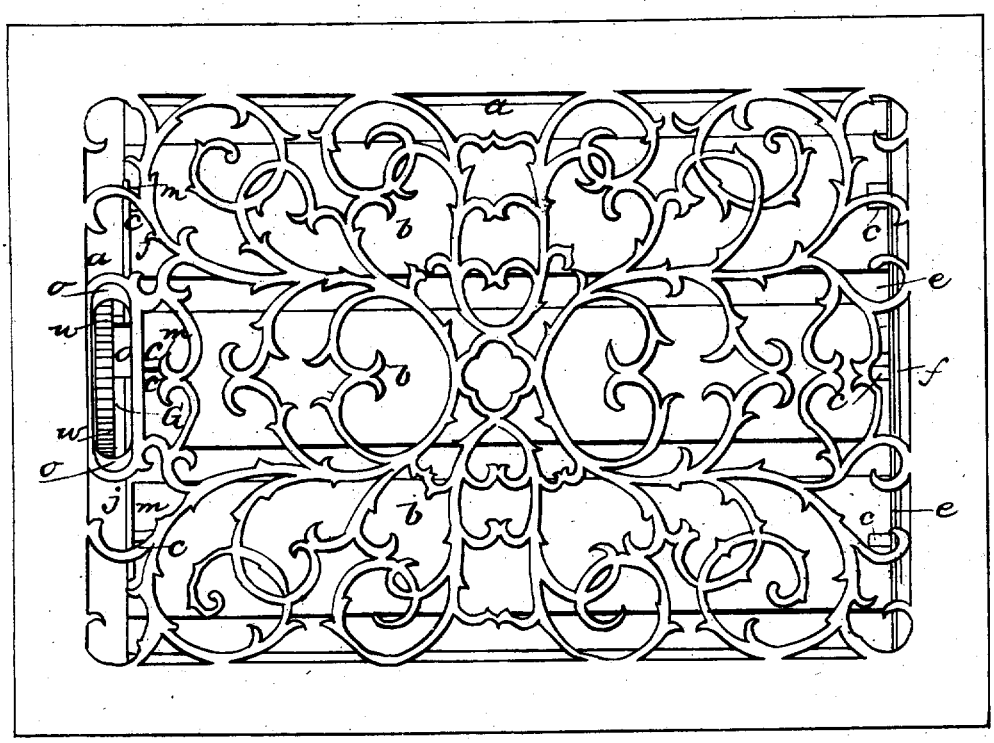
Figure 2:
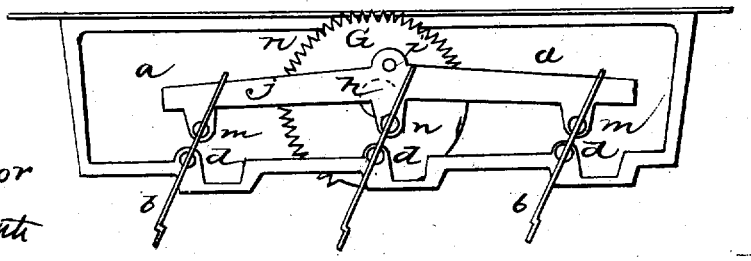
Figure 3:
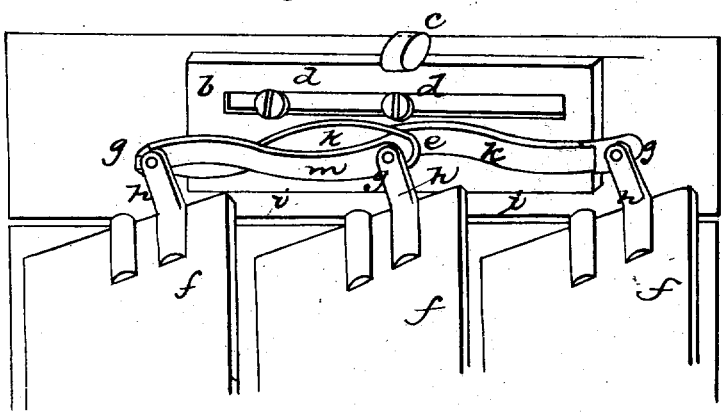
Figure 2:
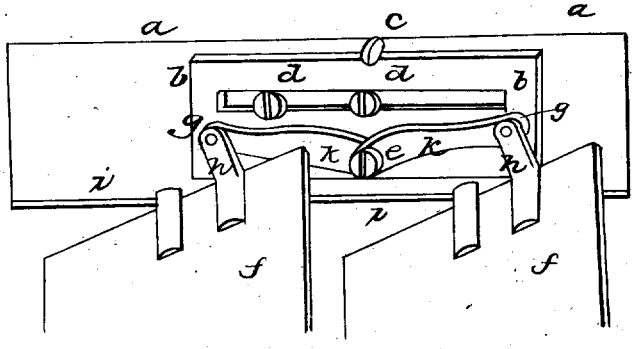

The valves *b b b*, Figure 1, three in number, (sometimes a greater or lesser number are used,) are suspended in the frame of the register at a sufficient depth or distance from its top or scroll-work, so that when they are open the edge of the fans or valves will not come in contact with the top of the register. The pins or axles *c c c*, upon which the valves are suspended, and upon which they should turn freely, are situated at the ends of the valves, at or near their middle. One end of the valves is secured in the frame by the pins *c c c*, playing in the holes *d d d* (see Fig. 2) in the frame. The opposite ends of the valves are secured by the strip *e e*, which is secured firmly and closely over the ends of the pins *c c c* by a screw at *f*. At the end of the register, and playing freely upon its center, is the wheel G, attached to the register by the means of a screw or pin, *h*. (See Fig. 2.) This screw or pin is firmly fixed in the frame, and forms the axle of the wheel. The wheel is preserved on its axle by a head on this pin or axle, which head must be flush with the surface of the wheel. Upon the wheel, situated at a distance from its center, is the pin *i*, Fig. 2. This pin must be placed horizontally with the center of the wheel when the register is closed. Upon this pin *i* is suspended the connecting-rod *j j*, shaped nearly as in the drawing Fig. 2, or in any convenient manner, and moving freely upon its axle *i*. This connecting-rod rises or falls in a circular direction when the wheel is put in motion. This connecting-rod is attached to the valves at *m m m* by pins on the ends of the valves. These pins are situated at the same distance from the centers of the axles at *d d d*, Fig. 2, that the pin *i* is from the center *h*. This is necessary in order that the register may work without binding at any stage of its opening or closing.

Now, it will be perceived that when the wheel is moved for the purpose of opening the register the connecting-rod *j j* is raised with it, and also that side of the valves to which the connecting-rod is attached is raised, and consequently opened in proportion to the distance which the wheel is moved. The opposite motion cannot fail to close the valves of the register. The top of the wheel G is notched, as at *n n*, so that the foot will act upon it with more certainty. There is a recess around the wheel in the surface of the register, as at *o o o*, for the purpose of giving free access to the edge or notched surface of the wheel to turn it. The notched edge should be flush with the surface of the register.

Having thus briefly described the construction and operation of the register, we will briefly state what we believe to be new about it, and what are some of the improvements made.

We regard as new the adoption of the upright or vertical wheel or segment of a wheel as a moving-power, together with the arrangement of the connecting-rod, which moves in a circular direction with the wheel, the said rod being attached to the valves, as previously described. The improvements attained are, some of them, as follows: First, the vertical wheel or segment by its position enables persons to impart motion to it with the foot (when placed in the floor, as it more commonly is) without stooping down, this being an improvement in point of convenience; second, the employment of the wheel and connecting-rod very greatly diminishes friction, giving it an advantage in opening with more ease than any register now in use; third, from the nature of its construction it needs no holder, key, or other device which may or may not be at hand when needed to open the register, being an improvement in point of time in opening, and also safety from burning the fingers.

The arrangement admits of the machinery for opening and working the register being placed compactly in one end of the register. In this position they afford no obstruction to the passage of warm air through it, which is very desirable.

We do not claim the wheel itself as new, or a thing by any means patentable; but We do claim as new and desire to secure by Letters Patent—

The application of the upright or vertical wheel G, or part or segment of a wheel, to the opening and closing of hot air registers or ventilators, the edge or periphery of which wheel is so placed as to adapt it to be operated on by the foot, if desired, substantially as set forth.

EDWARD A. TUTTLE.
WM. TUTTLE.
JAMES S. BAILEY.

Witnesses:
S. H. WALES,
JAMES LAIRD.